United States Patent
Tester (10) Patent No.: US 9,804,055 B2
(45) Date of Patent: Oct. 31, 2017

(54) ENGINE OVERSPEED DETECTION CIRCUIT AND METHOD

(71) Applicant: Pyroban Limited, Shoreham-by-sea, Sussex (GB)

(72) Inventor: Nigel Tester, Newick (GB)

(73) Assignee: Pyroban Limited, West Sussex (GB)

( * ) Notice: Subject to any disclaimer, the term of this patent is extended or adjusted under 35 U.S.C. 154(b) by 253 days.

(21) Appl. No.: 14/435,971

(22) PCT Filed: Oct. 30, 2012

(86) PCT No.: PCT/EP2012/071491
§ 371 (c)(1),
(2) Date: Apr. 15, 2015

(87) PCT Pub. No.: WO2014/067561
PCT Pub. Date: May 8, 2014

(65) Prior Publication Data
US 2015/0268130 A1    Sep. 24, 2015

(51) Int. Cl.
| | | |
|---|---|---|
| G01M 15/04 | (2006.01) | |
| F02D 41/00 | (2006.01) | |
| G01P 3/488 | (2006.01) | |
| F02B 77/08 | (2006.01) | |

(52) U.S. Cl.
CPC .......... G01M 15/046 (2013.01); F02B 77/08 (2013.01); F02D 41/0097 (2013.01); G01P 3/488 (2013.01); B60W 2510/0638 (2013.01)

(58) Field of Classification Search
CPC .............................. F02D 41/02; G01M 15/046

USPC ....................................................... 73/114.25
See application file for complete search history.

(56) References Cited

U.S. PATENT DOCUMENTS

| | | | | |
|---|---|---|---|---|
| 3,900,013 A | * | 8/1975 | Vignozzi | F02P 5/045 123/335 |
| 4,090,480 A | * | 5/1978 | Kasiewicz | F02D 11/10 123/352 |
| 4,092,955 A | * | 6/1978 | Reddy | G01P 3/4802 123/436 |
| 4,115,831 A | | 9/1978 | Minakuchi | |
| 4,198,933 A | | 4/1980 | Sieber et al. | |

(Continued)

FOREIGN PATENT DOCUMENTS

| | | |
|---|---|---|
| CN | 1520022 | 8/2004 |
| CN | 2733027 | 10/2005 |

(Continued)

OTHER PUBLICATIONS

European Patent Office, International Search Report in International Patent Application No. PCT/EP2012/071491, dated Jul. 18, 2013, 2 pp.

*Primary Examiner* — Peter Macchiarolo
*Assistant Examiner* — Timothy Graves (57) ABSTRACT

An engine over speed detection circuit for determining an engine over speed condition is described. The circuit includes a detection unit configured to send a pulsed signal indicative of engine speed; a reactive impedance configured to discharge upon receipt of a pulse of the pulsed signal at a rate defined by the pulsed signal; a comparator unit to compare a voltage or current value of the reactive impedance with a threshold value and to output the result of the comparison at the rate of the pulsed signal.

15 Claims, 4 Drawing Sheets

(56) References Cited

U.S. PATENT DOCUMENTS

| | | | |
|---|---|---|---|
| 4,641,618 A | 2/1987 | Dogadko et al. | |
| 4,938,189 A | 7/1990 | Morita et al. | |
| 4,964,385 A | 10/1990 | Staerzl | |
| 5,708,378 A | 1/1998 | Horie et al. | |
| 6,642,866 B2 * | 11/2003 | Kuo | H03M 1/1004 341/118 |
| 7,049,859 B2 | 5/2006 | Boyer et al. | |

FOREIGN PATENT DOCUMENTS

| | | |
|---|---|---|
| JP | 58174158 | 10/1983 |
| WO | WO 92-21876 A1 | 12/1992 |

\* cited by examiner

ENGINE OVERSPEED DETECTION CIRCUIT AND METHOD

TECHNICAL FIELD

This disclosure relates generally to engine monitoring systems, and more particularly, to detection circuits which are operable to detect engine over speed.

BACKGROUND

An engine may operate at excessive speeds which may result in causing damage. There may be known systems which limit the speed at which the engine operates. The known systems may respond to a signal indicative of engine speed in order to prevent the engine from operating at a speed in excess of a predetermined threshold value.

U.S. Pat. No. 4,090,480 may describe an electrical control system for preventing the speed of an engine from exceeding a predetermined value. The control system may include a reversible motor connected to an engine throttle control. A motor control circuitry may be connected so as to receive an input corresponding to the speed of the engine. When the speed of the engine exceeds the predetermined value, the control circuitry may actuate the throttle control to limit the engine speed to the predetermined value.

U.S. Pat. No. 4,964,385 may describe an engine over speed control circuit for a multicylinder internal combustion engine. The over speed control circuit may progressively cut out ignition to the cylinders depending upon the amount the threshold is exceeded. A monostable multivibrator may be set by the ignition pulse of a given cylinder to initiate a given timing interval of fixed duration. A charging capacitor circuit may have a first capacitor charged by the output of the monostable multivibrator during the timing interval, and discharged during a second timing interval until the next ignition pulse of the given cylinder. A latching comparator may be set by the ignition pulse of the given cylinder and may disable a cut-out switch which in turn permits ignition pulses to the cylinders. As engine speed increases, the ignition pulses of the given cylinder may be closer in time, and the second timing interval may be a lesser fraction of the time between ignition pulses of the given cylinder, such that the discharge time of the first capacitor becomes shorter, and the voltage on the first and second capacitors begins to increase along a positive slope ramp from a higher minimum, such that the voltage on the second capacitor reaches the threshold voltage at an earlier time following the ignition pulse of the given cylinder.

The present disclosure is directed, at least in part, to improving or overcoming one or more aspects of the prior art system.

BRIEF SUMMARY OF THE INVENTION

In a first aspect, the present disclosure describes an engine over speed detection circuit comprising a detection unit configured to send a pulsed signal indicative of engine speed; a reactive impedance configured to discharge upon receipt of a pulse of the pulsed signal at a rate defined by the pulsed signal; a comparator unit to compare a voltage or current value of the reactive impedance with a threshold value and to output the result of the comparison at the rate of the pulsed signal.

In a second aspect, the present disclosure describes an engine over speed detection method. The method may comprise the steps of sending a pulsed signal indicative of engine speed by a detection unit; discharging a reactive impedance upon receipt of a pulse of the pulsed signal at a rate defined by the pulsed signal; comparing a voltage or current value of the reactive impedance with a threshold value; and outputting the result of the comparison at the rate of the pulsed signal.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

Figure 1:
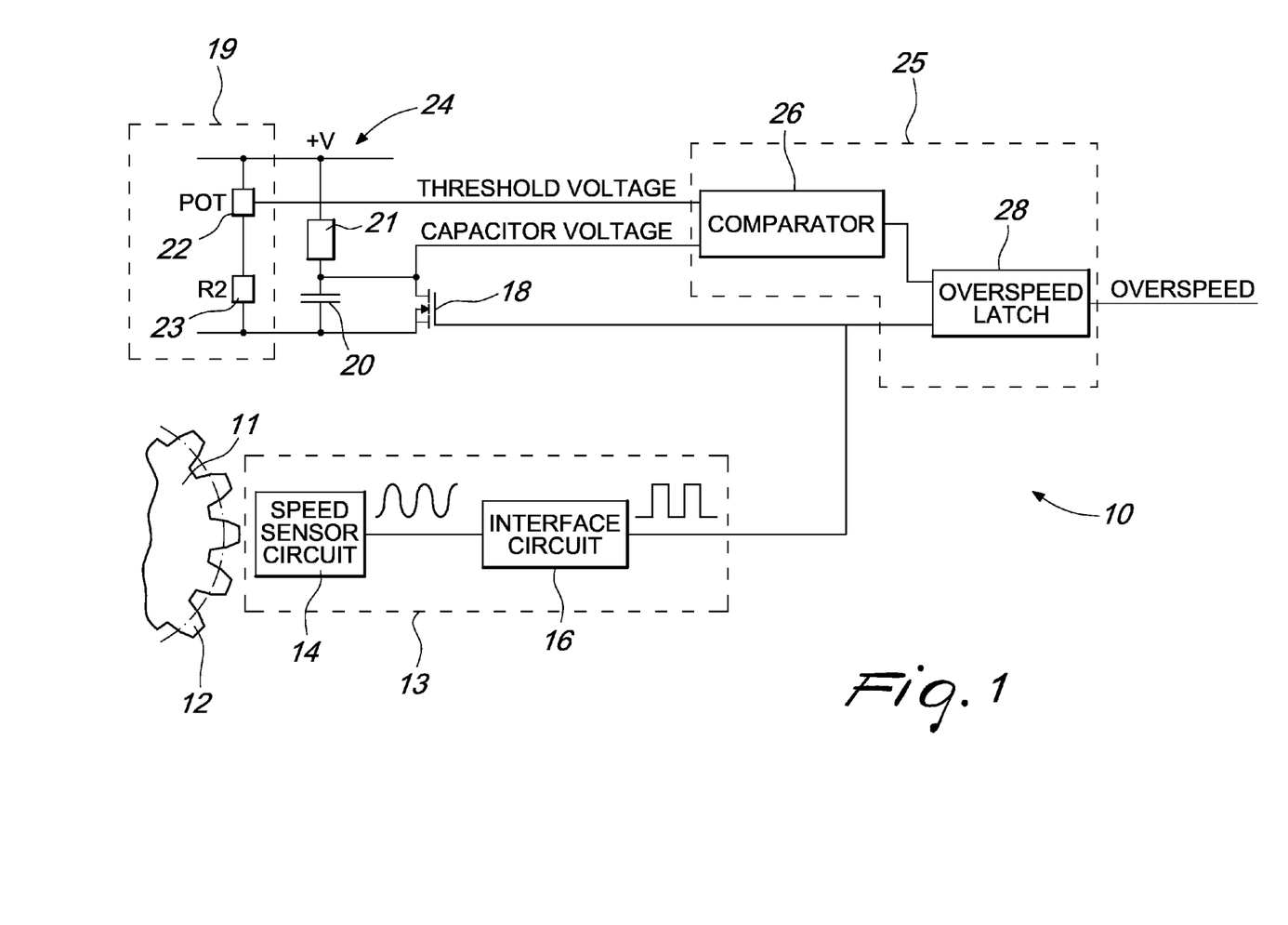
FIG. 1 is a schematic block diagram of an engine over speed detection circuit according to the present disclosure.

This disclosure generally relates to an engine over speed detection circuit 10 and an engine over speed detection method.

The engine over speed detection circuit 10 may comprise a detection unit 13. The detection unit 13 may be configured to send a pulsed signal indicative of engine speed. The detection unit 13 may be configured to detect movement of an engine component. Movement of the engine component may be indicative of engine speed. Detection unit 13 may emit a pulsed signal upon detection of movement of the engine component.

The detection unit 13 may comprise a speed sensor circuit 14 and an interface circuit 16. The speed sensor circuit 14 may include a speed sensor. The speed sensor may be a variable reluctance speed sensor. The speed sensor circuit 14 may emit a signal indicative of engine speed. The signal indicative of engine speed may be an analog signal. The output signal of the speed sensor circuit 14 may approximate a sine wave.

The output analog signal may have a frequency limited by the speed sensor. The output analog signal may have a frequency at maximum normal engine speed that ranges from 1 KHz to 12 KHz. The output analog signal may have a frequency at maximum normal engine speed that ranges from 2 KHz to 7 KHz.

In an embodiment the detection unit 13 may comprise the interface circuit 16 with a sensor that outputs at a frequency related to the engine speed. The sensor may be a hall sensor or an optical-sensor.

The detection unit 13 may be configured to detect passage of gear teeth 12. The engine component may be a ring gear 11 of the engine. The detection unit 13 may be configured to detect passage of a rotating or reciprocating engine component. The detection unit 13 may be configured to detect passage of the teeth 12 of the ring gear 11. In an embodiment, the detection unit 13 may be configured to detect passage of an alternator pulley.

The engine speed may be monitored by the variable reluctance magnetic speed sensor that is suitably disposed in the engine compartment so as to detect passage of the teeth 12 on the ring gear 11.

The output analog signal of the speed sensor circuit 14 may be dependent upon the maximum normal engine speed and the number of teeth 12 on the ring gear 11 of the engine.

The output analog signal may be sent to the interface circuit 16. The analog signal may be converted to a pulsed signal by the interface circuit 16. The interface circuit may be an interface integrated circuit on a control board.

The engine over speed detection circuit 10 may comprise a reactive impedance 20. The reactive impedance 20 may be connected to the detection unit 13 so as to receive the pulse signal. The reactive impedance 20 may be configured to discharge upon receipt of a pulse of the pulsed signal. The reactive impedance 20 may be configured to discharge at a rate defined by the pulsed signal. The reactive impedance 20 may have a voltage or current at discharge.

The reactive impedance 20 may be a capacitor 20. In an embodiment, the reactive impedance 20 may be an inductor.

The capacitor 20 may be charged by a voltage source 24. The capacitor 20 may be connected in series with a resistor 21. The capacitor 20 may be charged through the resistor 21.

The engine over speed detection circuit 10 may comprise an active switch 18. The active switch 18 may be connected to the reactive impedance 20. The active switch 18 may be connected in the circuit 10 such that the pulsed signal from the detection unit 13 may be sent to the active switch 18. The active switch 18 may be configured to be on upon receipt of the pulsed signal. The active switch 18 may be turned on upon receipt of a pulse of the pulsed signal. The active switch 18 may be connected to the reactive impedance 20 such that the reactive impedance 20 discharges when the active switch 18 is on.

The active switch may be a transistor 18 connected to the capacitor 20. The transistor 18 may be connected in parallel to the capacitor 20. The capacitor 20 may be discharged through the transistor 18. In an embodiment, the active switch may be a transistor 18 connected to the inductor. The transistor 18 may be connected in series to the inductor.

The engine over speed detection circuit 10 may comprise a comparator unit 25 to compare the voltage or current value of the reactive impedance 20 with a threshold value. The comparator unit 25 may be configured to output the result of the comparison at the rate of the pulsed signal.

The comparator unit 25 may be connected to the detection unit 13 so as to receive the pulsed signal. The comparator unit 25 may be connected to the interface circuit 16 so as to receive the pulsed signal. The comparator unit 25 may be connected to the reactive impedance 20 so as to receive the discharge voltage or current value of the reactive impedance 20.

The comparator unit 25 may be provided with a threshold voltage or current value. The threshold voltage or current value may be predetermined during a calibration process.

The comparator unit 25 may be supplied with a voltage through the voltage source 24. The voltage from the voltage source 24 may be determined by a voltage divider 19. The voltage divider may comprise a resistor 23 and a potentiometer 22. The voltage supplied to the comparator unit 25 may be a fraction of the voltage at the voltage source 24.

The comparator unit 25 may comprise a comparator 26 which compares the discharge voltage or current value of the reactive impedance 20 to the threshold value. The comparator 26 may compare the discharge voltage value of the capacitor 20 to the threshold voltage value. The voltage value may be derived from the voltage source 24 through the voltage divider 19. The comparator 26 may produce an output based on the result of the comparison.

The voltage source 24 provides the charging voltage to the capacitor 20 and the threshold voltage value to the comparator unit 25. The comparison of the threshold voltage value and the discharge voltage value may be independent of the voltage at the voltage source 24.

The comparator unit 25 may comprise an over speed latch 28. The over speed latch 28 may have a clock input that is connected to the detection unit 13. The clock input may receive the pulsed signal from the detection unit 13. The clock input may be connected to the interface circuit 16. The clock input may receive the pulsed signal from the interface circuit 16. The over speed latch 28 may have a data input that is connected to the comparator 26 so as to receive the result of the comparison. The over speed latch 28 may provide an output that is indicative of whether an engine over speed condition is present.

Figure 2:
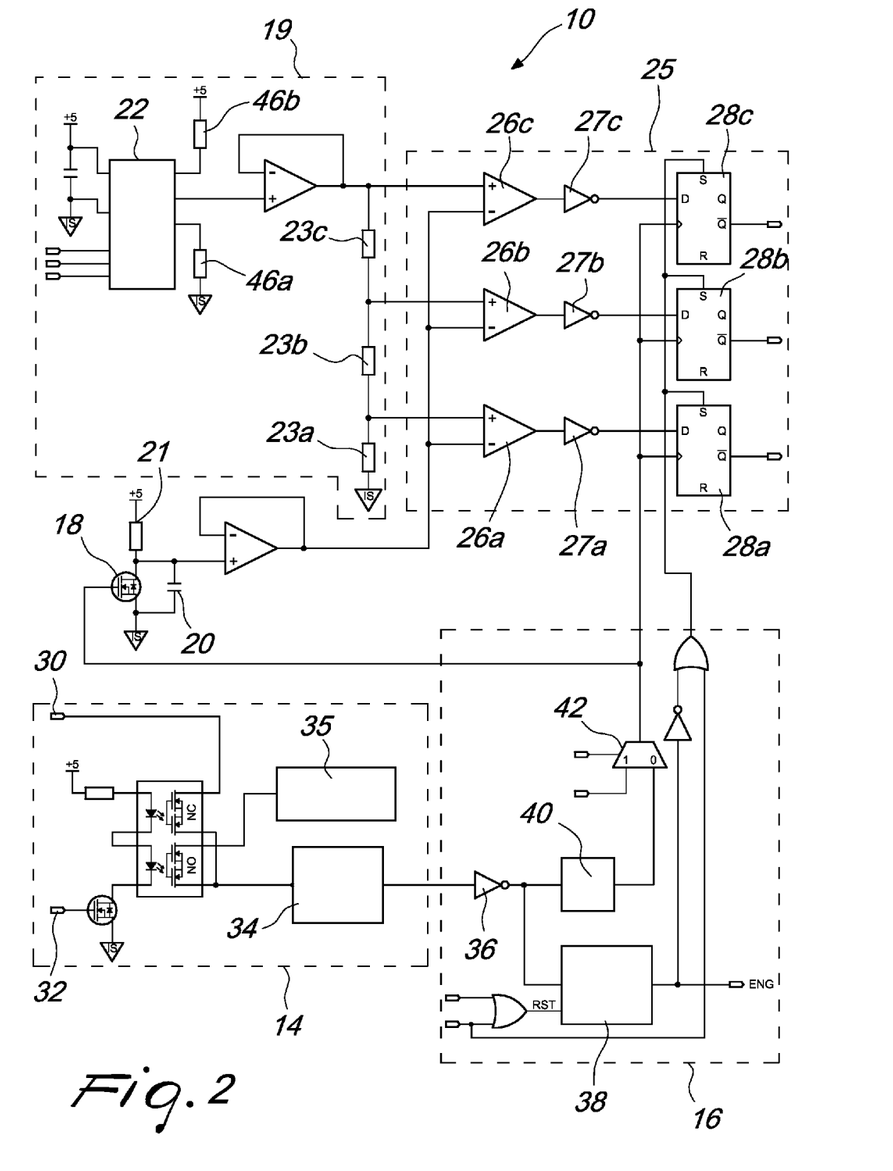
FIG. 2 is an engine over speed detection circuit diagram according to the present disclosure.

FIG. 2 shows a circuit diagram of the engine over speed detection circuit 10. The speed sensor circuit 14 may comprise an engine speed input 30. An engine speed test input 32 may be provided. During operation of the engine, the engine speed test input 32 will not be provided with any signal. The engine speed input 30 may be provided with an AC engine speed signal by the passage of the engine component, in particular the passage of the teeth 12 of the ring gear 11. The speed sensor circuit 14 may comprise an oscillator 35.

The AC engine speed signal may be sent to the speed sensor 34. The AC engine speed signal may be sent to a variable reluctance sensor in the speed sensor 34. The AC engine speed signal may be sent via a solid state input selection relay. The speed sensor circuit 14 may have an output emitted by the speed sensor 34. The output may be sent to the interface circuit 16.

The positive going pulse signal may occur on each positive zero crossing of the AC engine speed signal. The positive going pulse signal may be sent to the transistor 18. The positive going pulse signal may be sent to three latches 28*a*, 28*b*, 28*c*. The three latches 28*a*, 28*b*, 28*c* may be mutually connected in parallel. The three latches 28*a*, 28*b*, 28*c* provide representative outputs of NEARLY MAX; CALIBRATION; and OVERSPEED.

OVERSPEED may be the signal used for determining of an over speed condition. NEARLY MAX may be used to give an indication that the engine is close to the over speed trip point. The NEARLY MAX output may be used in two ways:

i. To give confidence in the over speed calibration. An indicator (e.g. an LED light) may be actuated by the NEARLY MAX signal. If the engine is operating at a normal maximum speed the NEARLY MAX LED may be on.

ii. If the speed sensor circuit 14 is put into a test mode then an over speed trip and engine shutdown may occur when NEARLY MAX becomes active. This may allow the shutdown function to be tested by running the engine at normal maximum speed. The engine does not have to be operated above normal maximum speed in order to test the over speed shut down function.

CALIBRATION may be used during over speed calibration to set the potentiometer correctly so that OVERSPEED output may become active at a higher speed and NEARLY_MAX output may become active at a lower speed.

In an embodiment, the positive going pulse signal may be inverted by a signal inverter 36. The inverted pulse signal may be sent to the engine operation detector 38 for detecting engine operation. Engine operation signal may be used in conjunction with an oil pressure sensor as a diagnostic. If the oil pressure is present (e.g. when the engine is running) but no speed signal is present then a speed sensor fault may be generated.

The over speed detection circuit 10 may operate at the frequency of the engine speed pulses. In order to allow operation at a lower speed the engine speed signal may be divided to allow operation at a lower speed.

The inverted pulse signal may be sent to a divider 40 to output a pulsed signal indicative of the working engine speed. The divider 40 may reduce the signal intensity of the inverted pulse signal. The divider 40 may divide the input pulsed signal down by 8 to produce a lower frequency square wave signal. The divided pulsed signal may be sent to the transistor 18. The divided pulsed signal may be sent to the latches 28a, 28b, 28c.

In an embodiment, the divided pulsed signal may first be sent to a gate 42. Thereafter, the pulsed signal may be sent to the transistor 18 and the latches 28a, 28b, 28c.

Gate 42 may allow the engine speed signal feed to transistor 18 to be switched off so as to allows some circuit functions to be tested e.g. the capacitor 20 fully charges putting the comparator and latch outputs to a known state. These tests may be performed on each operation of the over speed detection circuit 10 prior to starting of the engine.

The capacitor 20 may be charged through resistor 21. The capacitor 20 may be charged through resistor 21 when pulsed signal from the interface circuit 16 is low.

The capacitor 20 may be discharged through transistor 18. The capacitor 20 may be discharged through transistor 18 when pulsed signal from the interface circuit 16 is high. The capacitor 20 may be discharged through transistor 18 upon receipt of a pulse of the pulsed signal by the transistor 18.

The discharge voltage of the capacitor 20 may be sent to each voltage comparator 26a, 26b, 26c. The three voltage comparators 26a, 26b, 26c may be mutually connected in parallel. The discharge voltage of the capacitor 20 may be indicative of the operating speed of the engine at the time of discharge. The discharge voltage of the capacitor 20 may be compared against the three threshold voltage values. The three voltage comparators 26a, 26b, 26c may be used to generate OVERSPEED, NEARLY MAX and CALIBRATION outputs. Each output has a different speed signal. Each threshold voltage value is representative of three speed thresholds. Each of the three speed thresholds may be set by a calibration procedure performed with the engine running at maximum normal speed. The engine speed at capacitor discharge may be compared against three speed threshold voltages.

The threshold voltage values may be determined by the voltage divider 19. The voltage divider 19 may comprise a resistor divider chain 44. The threshold voltage values may be determined by the resistor divider chain 44 comprising resistors 23a, 23b, 23c. The resistor divider chain 44 may be connected to a buffered variable voltage source. The variable voltage source may comprise an electrically adjustable potentiometer 22 connected to resistors 46a, 46b. The threshold voltage value for each comparator 26a, 26b, 26c may be derived from the resistor divider chain 44. The threshold voltage value for each comparator 26a, 26b, 26c may be derived through the respective resistors 23a, 23b, 23c.

The three voltage comparators 26a, 26b, 26c may be mutually connected in parallel to the resistor divider chain. Each comparator 26a, 26b, 26c may have a first input terminal connected to the reactive impedance 20 and a second input terminal connected to the resistor divider chain 44. Each comparator 26a, 26b, 26c may have a first input terminal connected to the capacitor 20 and a second input terminal connected to the resistor divider chain 44.

The output from each of the voltage comparators 26a, 26b, 26c may be sent to the respective latches 28a, 28b, 28c.

The output from each of the comparators 26a, 26b, 26c may be sent to three buffer transistors 27a, 27b, 27c. The buffer transistors 27a, 27b, 27c may invert each output. The inverted output from each buffer transistor 27a, 27b, 27c may be sent to the respective latches 28a, 28b, 28c.

The voltage on the capacitor 20 at the point of discharge may be compared with each speed threshold voltage. The stored voltage in the capacitor 20 may rise up to the point of discharge through charging via resistor 21. Discharge may occur upon receipt of a pulse from the interface circuit 16. If the discharge voltage is at or above the threshold voltage in each voltage comparator 26a, 26b, 26c, the engine speed may be below the over speed threshold and an engine over speed condition may not be present. If the discharge voltage is below the threshold voltage in each comparator 26a, 26b, 26c, the engine speed may be over the over speed threshold and an engine over speed condition may be present.

The output of each buffer transistor 27a, 27b, 27c may be low initially. Each output may be switched high when the capacitor voltage reaches the threshold voltage in each comparator 26a, 26b, 26c.

Part of the logic of the interface circuit 16 may run at the frequency of the engine clock pulse (or a division thereof). The remaining logic may run at a fixed clock frequency. The asynchronous inputs (OVERSPEED, NEARLY MAX and CALIBRATION) may need to be synchronised to the synchronous logic before use.

The logic to discharge the capacitor 20 and to latch the output of each of the comparator 26a, 26b, 26c in synchronism with the engine speed may be contained within the interface circuit 16. The latched speed signals are momentary and are not synchronised with the clock of the interface circuit 16. Semaphores may be used to transfer the latched speed comparator signals to the interface circuit 16 clocked synchronous logic.

Figure 3:
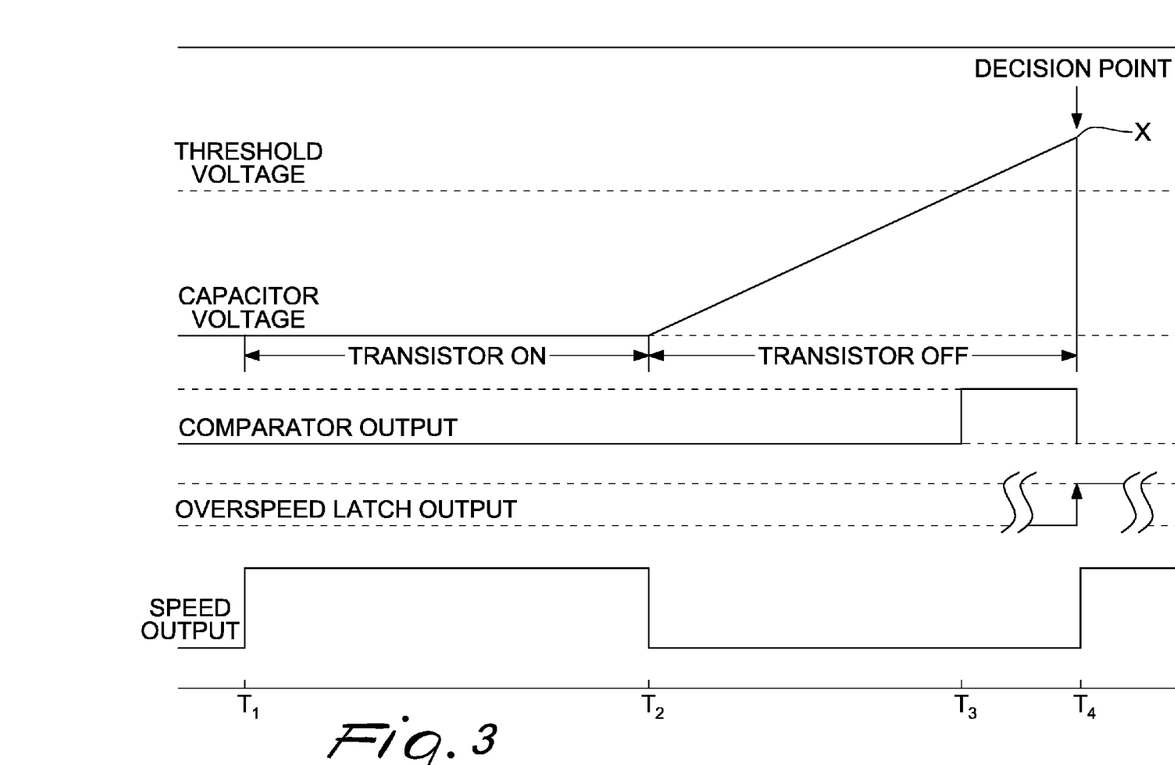
FIG. 3 is a graph illustrating operation of the engine over speed detection circuit when the engine speed is below an over speed threshold.

With respect to FIG. 3, the engine speed may be below the over speed threshold if the capacitor voltage rises to a comparator threshold voltage before being discharged by the next engine speed pulse. Between $T_1$ and $T_2$ the pulse of the pulsed signal from the interface circuit 16 may be received by the transistor 18 which is switched to on. The capacitor 20 may be discharged.

At $T_2$ signal from the interface circuit 16 may be low and may be received by the transistor 18 which is switched off. The capacitor 20 may begin charging and capacitor voltage may reach the threshold voltage at $T_3$. The comparator 26 output may be high at $T_3$.

At $T_4$ signal from the interface circuit 16 may be high and may be received by the transistor 18 which is turned on. The capacitor 20 may discharge and the comparator 26 output may be low.

The over speed latch 28 may be switched high at decision point X. The output of the over speed latch 28 may indicate the absence of an over speed condition.

Figure 4:
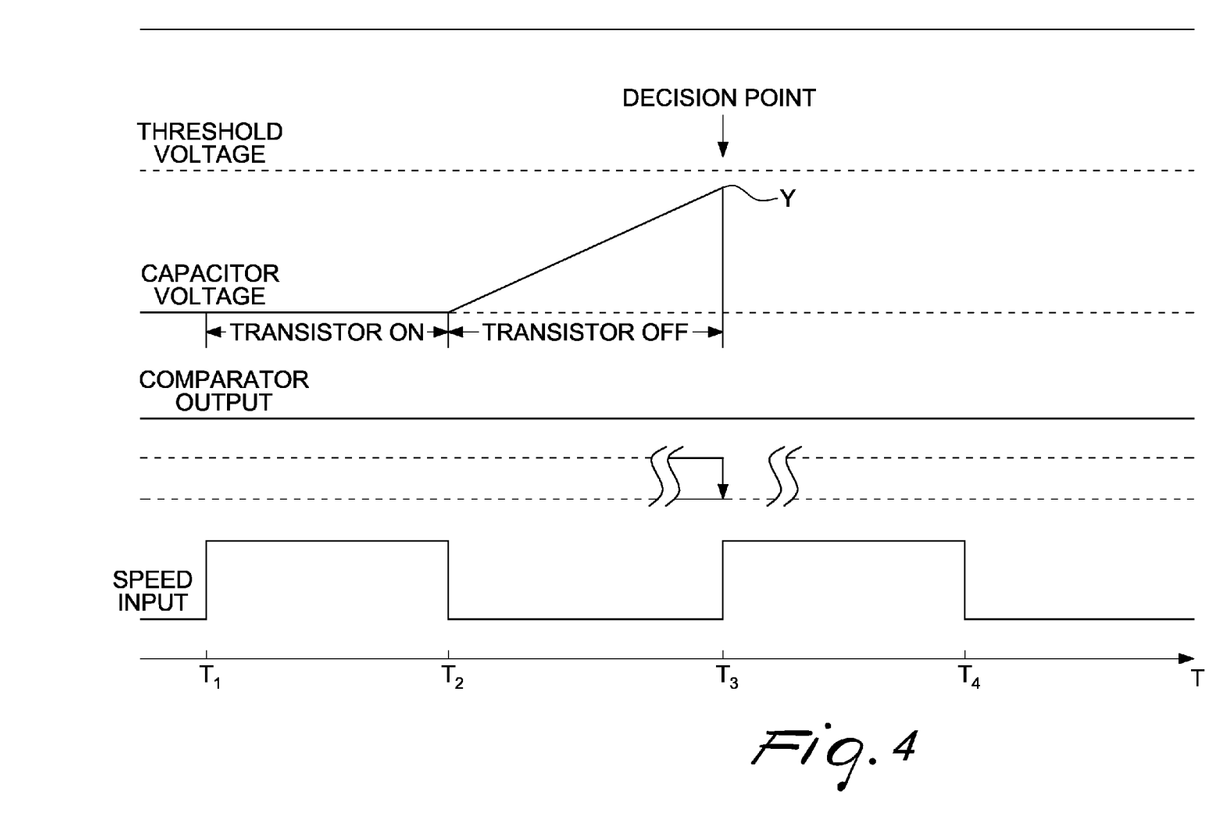
FIG. 4 is a graph illustrating operation of the engine over speed detection circuit operation when the engine speed is above an over speed threshold.

With respect to FIG. 4, the engine speed may be above the over speed threshold if the capacitor voltage does not rise to a comparator threshold voltage before being discharged by the next engine speed pulse. Between $T_1$ and $T_2$ the pulse of the pulsed signal from the interface circuit 16 may be received by the transistor 18 which is switched on. The capacitor 20 may be discharged.

At $T_2$ signal from the interface circuit 16 may be low and may be received by the transistor 18 which is switched off.

The capacitor 20 may begin charging. The capacitor voltage may reach a voltage lower than the threshold voltage at $T_3$ when a pulse is received by the transistor 18 which may be switched on. The capacitor 20 may discharge and the comparator 26 output may be low.

The over speed latch 28 may be switched low at decision point Y. The output of the over speed latch 28 may indicate the presence of an over speed condition.

The circuit 10 may further comprise emergency stop mechanisms so as to stop the engine upon detection of an engine over speed condition. The circuit 10 may comprise shutdown valves that control the operation of the engine. The shut down valves may be air or fuel valves. The air valve may interrupt the air supply to the engine. The fuel valve may interrupt the fuel supply to the engine.

The shut down valves may remain open if no shut down inputs are active. In the event of a shut-down input being active the shut-down valves may be de-energised and the system may go into a shutdown state. The operation of the engine may be shut down by any one or more of the shutdown inputs.

In a flammable atmosphere the engine may continue to run even if the fuel supply is interrupted. In the event of an engine over speed condition, the air supply may be interrupted in addition to the interruption to the fuel supply.

An engine over speed detection method may comprise the steps of sending a pulsed signal indicative of engine speed by a detection unit; discharging a reactive impedance upon receipt of a pulse of the pulsed signal at a rate defined by the pulsed signal; comparing a voltage or current value of the reactive impedance with a threshold value; and outputting the result of the comparison at the rate of the pulsed signal.

The method may comprise comparing a voltage or current value of the reactive impedance with three threshold values.

The skilled person would appreciate that foregoing embodiments may be modified or combined to obtain the circuit 10 and the method of the present disclosure.

INDUSTRIAL APPLICABILITY

This disclosure describes an engine over speed detection circuit 10 and an engine over speed detection method. The circuit 10 and method may be implemented in vehicle engines. The circuit 10 and method may be implemented in diesel engines. The circuit 10 and method may monitor an engine for an over speed condition. The over speed condition may occur if excess flammable material is present. The engine may be stopped if an over speed condition is detected.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by references signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The invention claimed is:

1. An engine over speed detection circuit comprising:
   a detection unit configured to send a pulsed signal indicative of engine speed;
   a reactive impedance configured to discharge upon receipt of a pulse of the pulsed signal at a rate defined by the pulsed signal; and
   a comparator unit to compare a voltage or current value of the reactive impedance with a threshold value and to output a result of the comparison at the rate of the pulsed signal,
   wherein the comparator unit comprises three comparators mutually connected in parallel, each comparator of the three comparators having a first input terminal connected to the reactive impedance and a second input terminal connected to a resistor divider chain,
   wherein the resistor divider chain determines the threshold value for each comparator, and
   wherein the resistor divider chain is connected to a buffered variable voltage source comprising an electrically adjustable potentiometer connected to resistors.

2. The engine over speed detection circuit of claim 1 wherein the detection unit detects passage of gear teeth.

3. The engine over speed detection circuit of claim 1 wherein the detection unit comprises a speed sensor circuit.

4. The engine over speed detection circuit of claim 3 wherein the signal indicative of engine speed is an analog signal.

5. The engine over speed detection circuit of claim 4 wherein the analog signal is converted to the pulsed signal by an interface circuit.

6. The engine over speed detection circuit of claim 1 wherein the reactive impedance is connected to an active switch that is switched on upon receipt of the pulse.

7. The engine over speed detection circuit of claim 6 wherein the active switch is a transistor and the reactive impedance is a capacitor, the transistor being connected in parallel to the capacitor.

8. The engine over speed detection circuit of claim 1 wherein the comparator unit comprises an over speed latch having a clock input connected to the detection unit so as to receive the pulsed signal and data input connected to the comparator unit so as to receive the result of the comparison.

9. The engine over speed detection circuit of claim 8 comprising two latches connected in parallel with the over speed latch.

10. The engine over speed detection circuit of claim 2 wherein the reactive impedance is connected to an active switch that is switched on upon receipt of the pulse.

11. The engine over speed detection circuit of claim 3 wherein the reactive impedance is connected to an active switch that is switched on upon receipt of the pulse.

12. The engine over speed detection circuit of claim 2 wherein the comparator unit comprises an over speed latch having a clock input connected to the detection unit so as to receive the pulsed signal and data input connected to the comparator unit so as to receive the result of the comparison.

13. The engine over speed detection circuit of claim 3 wherein the comparator unit comprises an over speed latch having a clock input connected to the detection unit so as to receive the pulsed signal and data input connected to the comparator unit so as to receive the result of the comparison.

14. An engine over speed detection method comprising the steps of:
- sending a pulsed signal indicative of engine speed;
- discharging a reactive impedance upon receipt of a pulse of the pulsed signal at a rate defined by the pulsed signal;
- comparing, via a comparator unit, a voltage value or a current value of the reactive impedance with a threshold value; and
- outputting a result of the comparison at the rate of the pulsed signal,
- wherein the comparator unit comprises three comparators mutually connected in parallel, each comparator of the three comparators having a first input terminal connected to the reactive impedance and a second input terminal connected to a resistor divider chain,
- wherein the resistor divider chain determines the threshold value for each comparator, and
- wherein the resistor divider chain is connected to a buffered variable voltage source comprising an electrically adjustable potentiometer connected to resistors.

15. The engine over speed detection method of claim 14 wherein the step of comparing the voltage value or the current value of the reactive impedance with the threshold value involves comparing the voltage value or the current value of the reactive impedance with three threshold values.

* * * * *